United States Patent [19]

Miller

[11] E Re. 29,858

[45] Reissued Dec. 5, 1978

[54] DISPLAY PANEL

[75] Inventor: Donald E. Miller, Stockton, N.J.

[73] Assignee: Burroughs Corporation, Detroit, Mich.

[21] Appl. No.: 855,594

[22] Filed: Nov. 28, 1977

Related U.S. Patent Documents

Reissue of:

[64] Patent No.: 3,995,185
Issued: Nov. 30, 1976
Appl. No.: 636,919
Filed: Dec. 2, 1975

U.S. Applications:

[63] Continuation-in-part of Ser. No. 551,359, Feb. 20, 1975, abandoned.

[51] Int. Cl.[2] ..... H01J 61/06

[52] U.S. Cl. ..... 313/217; 313/188; 313/220

[58] Field of Search ..... 313/188, 201, 217, 220; 315/169 TV

[56] References Cited

U.S. PATENT DOCUMENTS 3,821,586 6/1974 Ogle ..... 313/188

*Primary Examiner*—Rudolph V. Rolinec
*Assistant Examiner*—Darwin R. Hostetter
*Attorney, Agent, or Firm*—Kevin R. Peterson; Robert A. Green

[57] ABSTRACT

The panel comprises a gas-filled envelope which contains a plurality of column cathode strips which are oriented parallel to each other, with insulating means dividing the surface of each such strip into a column of a plurality of separate operating areas including display cathode areas and priming or scanning cathode areas, the latter providing excited particles for use by the display areas. The column cathode strips, thus treated, form rows and columns of display cathodes and priming cathodes, and, in each column, there are gas communication paths between priming cathodes or areas and display cathodes or areas. In addition, there are gas communication paths along each row of priming cathodes so that each priming cathode, and each column of priming cathodes, can diffuse excited particles to adjacent priming cathodes. A separate display anode is provided in operative relation with each row of display cathodes, and a separate priming anode is provided in operative relation with each row of scan cathodes, and each crossing of an anode and cathode area forms a display cell or a priming cell.

In operation of the panel, the columns of priming cells are energized successively, and simultaneously, information signals are applied to selected display anodes, and this causes cathode glow to transfer through the appropriate gas communication paths to the display cathodes associated with the selected display anodes, from the associated priming cathodes. The selected display cathodes thus energized in the panel display a message.

18 Claims, 15 Drawubg Figures

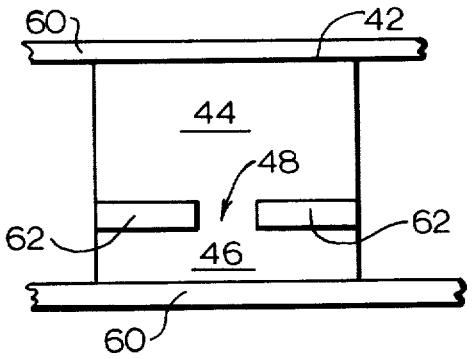
Fig. 2
Fig. 3
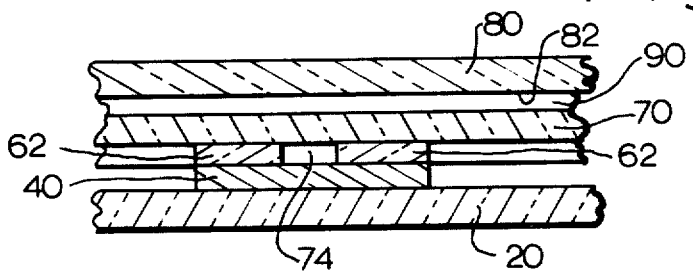
Fig. 4
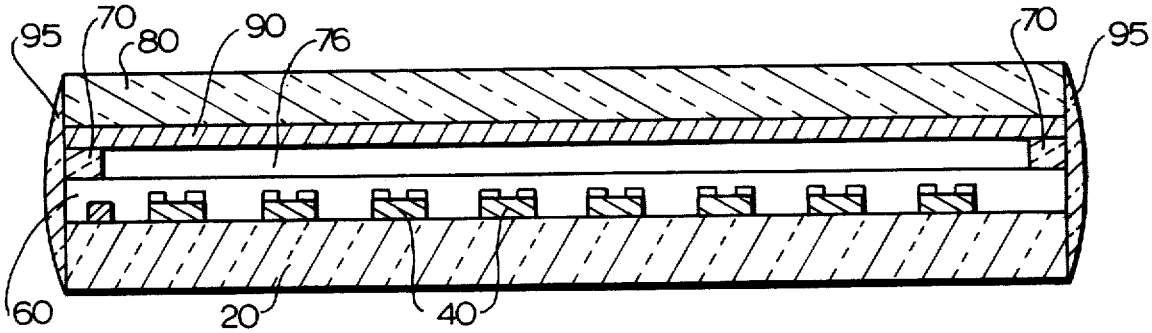
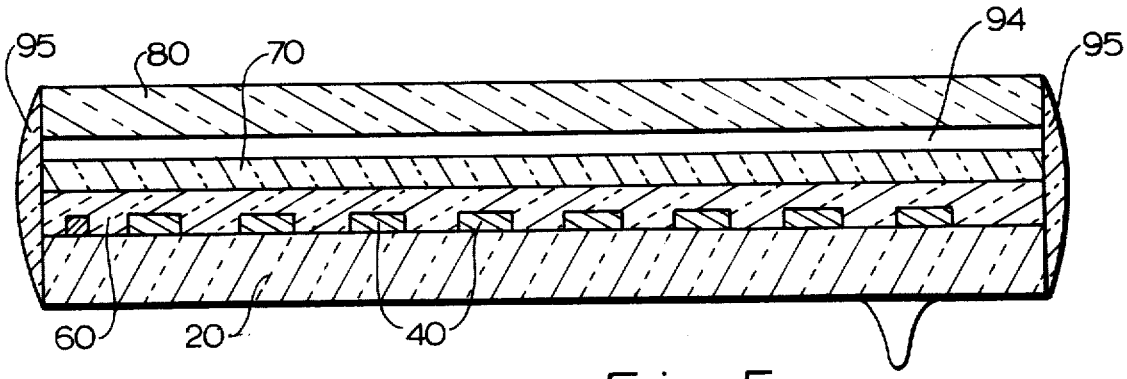
Fig. 5

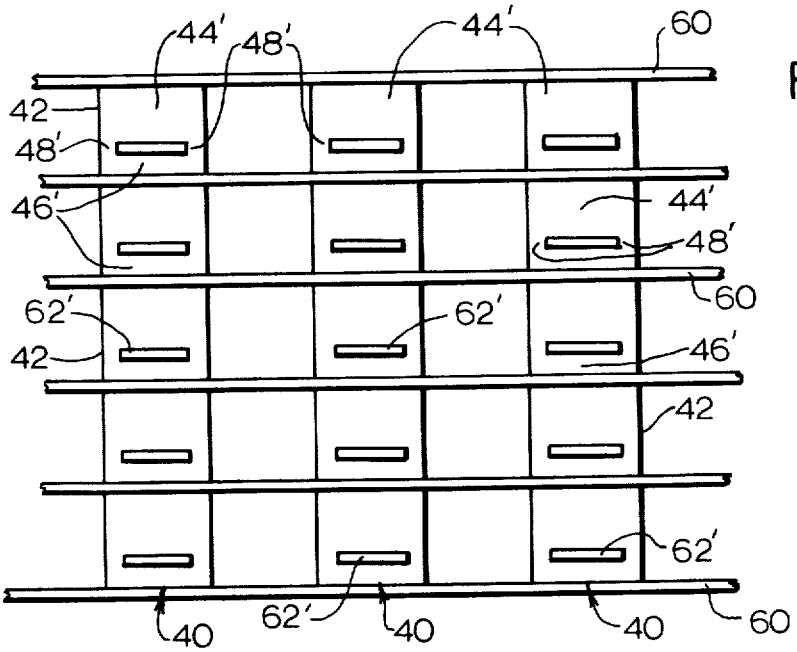
Fig. 7
Fig. 8
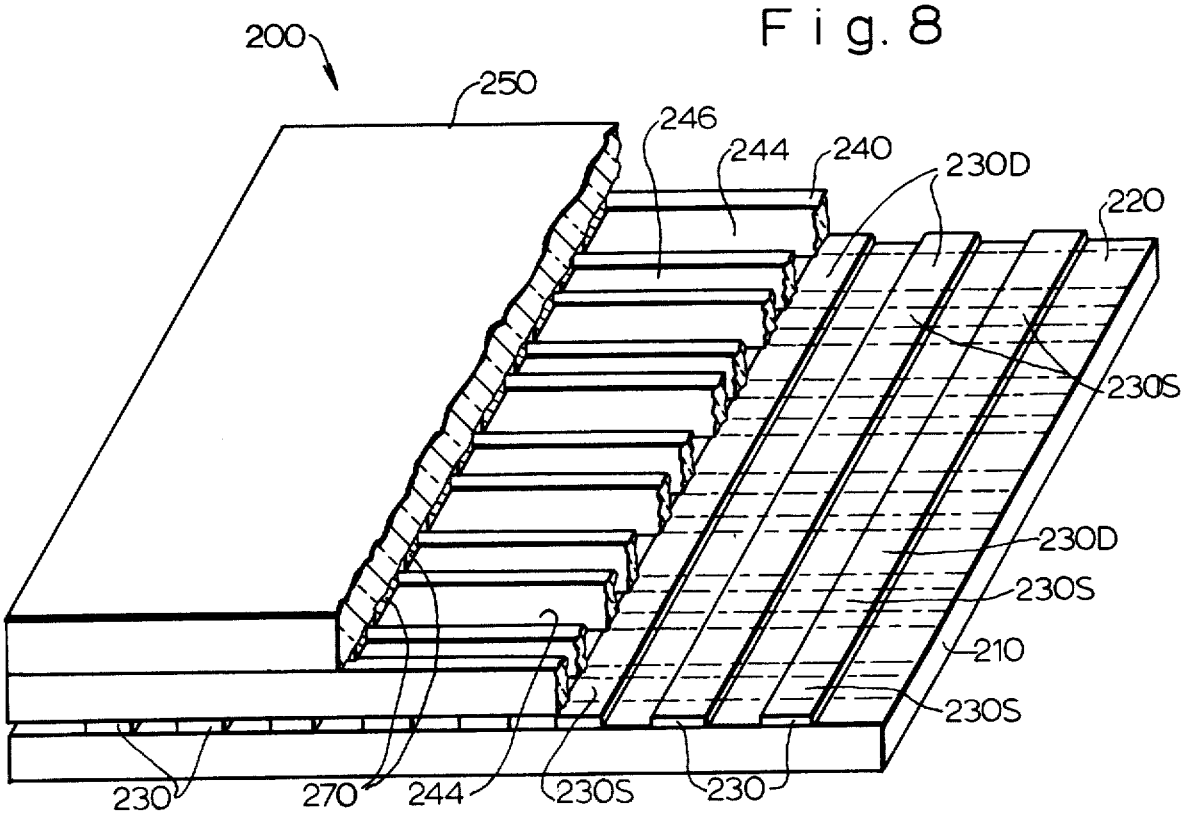

Fig. 9
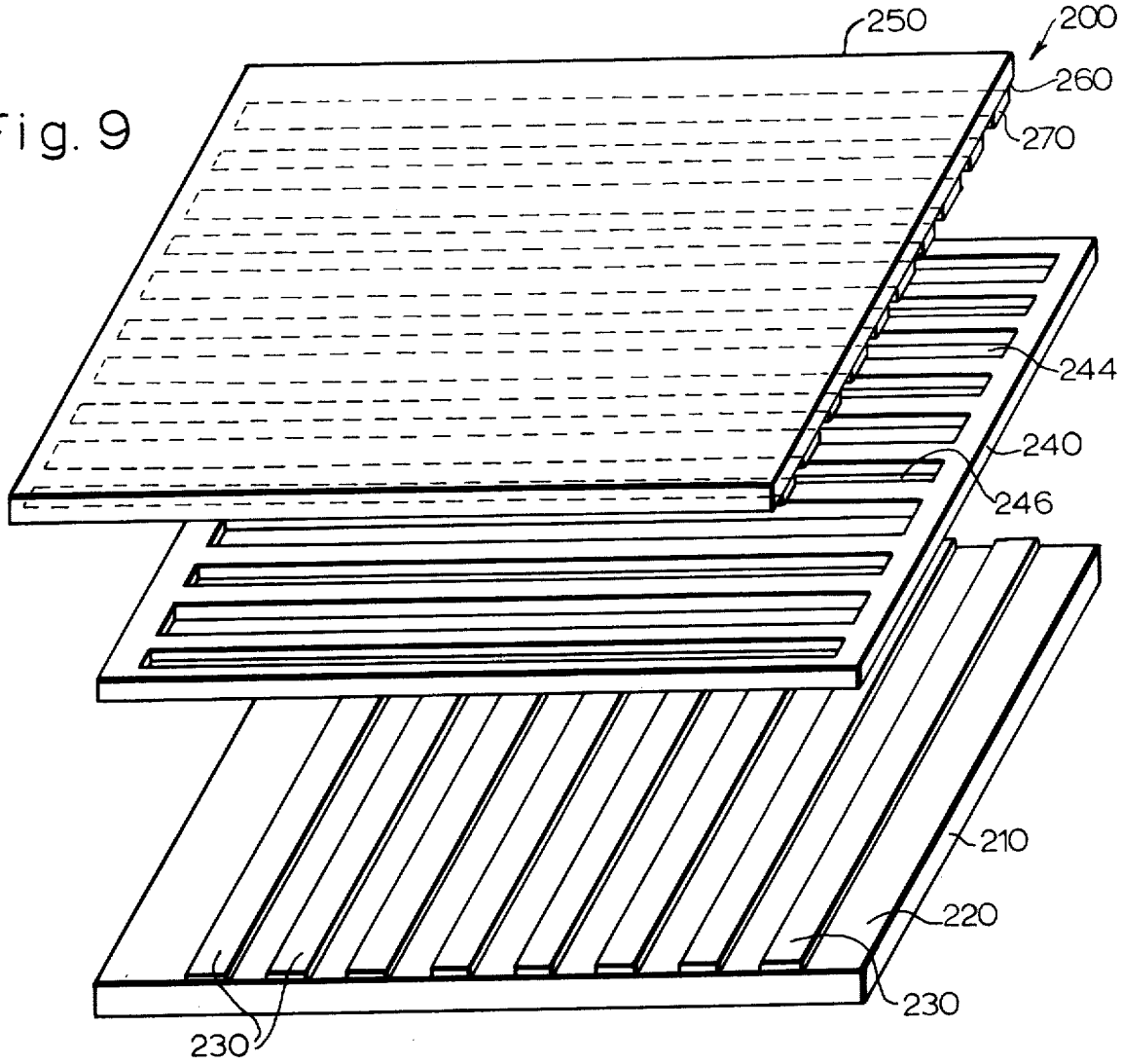
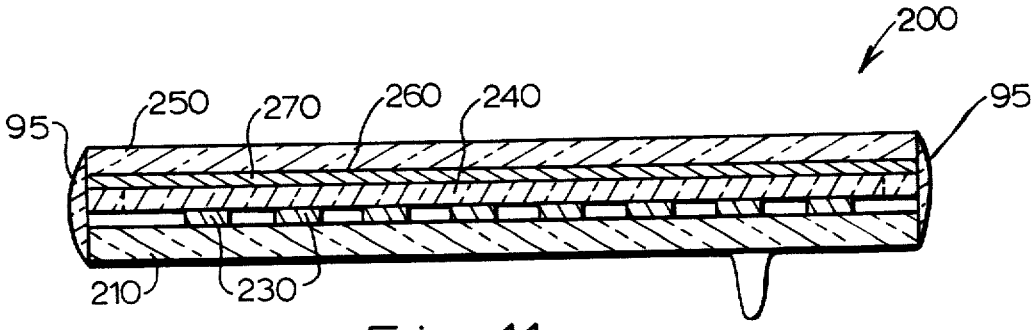
Fig. 11

DISPLAY PANEL

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of application Ser. No. 551,359, filed Feb. 20, 1975, abandoned.

BACKGROUND OF THE INVENTION

The principles of the invention relate to display panels of the type known as SELF-SCAN panels which are manufactured and sold by Burroughs Corporation. These panels are dot matrix devices which display characters by energizing and generating light in selected cells in a matrix of cells, usually a 5 × 7 matrix, with the total number of energized cells displaying a character. SELF-SCAN panels include separate arrays of scanning cells and display cells which are electrically connected to form a plurality of such 5 × 7 or other matrices, with the scanning cells being adapted to assist in the energization of selected display cells in accordance with input signal information. One form of SELF-SCAN panel is shown and described in U.S. Pat. No. 3,821,586. Panels of this type have achieved commercial success; however, there is a constant need for simplification in the component parts and structure of such devices for mass production manufacture. The present invention provides such simplification.

SUMMARY OF THE INVENTION

Briefly, a display panel embodying the invention includes a plurality of parallel column cathode strips including means dividing the surfaces of the strips into a plurality of separate operating areas, with similar areas being disposed in alignment in rows. The columns of areas thus formed include scanning or priming cathodes areas and display cathode areas, and separate anodes are provided for separately energizing each row of display cathodes and each row of priming cathodes. The panel is operated by separately energizing each column of priming cathodes and selectively transferring cathode glow to the associated display cathodes in accordance with input signal information applied to selected display anodes, the total number of display cathodes thus energized displaying a character or message.

DESCRIPTION OF THE DRAWINGS

FIG. 2 is an enlarged view of a portion of the panel of FIG. 1;

FIG. 3 is a sectional view of a portion of the panel of FIG. 1 assembled;

FIG. 4 is a sectional view, along the lines 4—4, in FIG. 1 showing the panel assembled;

FIG. 5 is a sectional view, along the lines 5—5, in FIG. 1 showing the panel assembled;

FIG. 7 is a plan view of a modification of a portion of the panel of FIG. 1;

FIG. 8 is a perspective view, partly in section, of a panel modification of the invention;

FIG. 9 is an exploded perspective view of the panel of FIG. 8;

FIG. 11 is a sectional view of the panel of FIG. 8;

DESCRIPTION OF THE PREFERRED EMBODIMENTS

Figure 1:
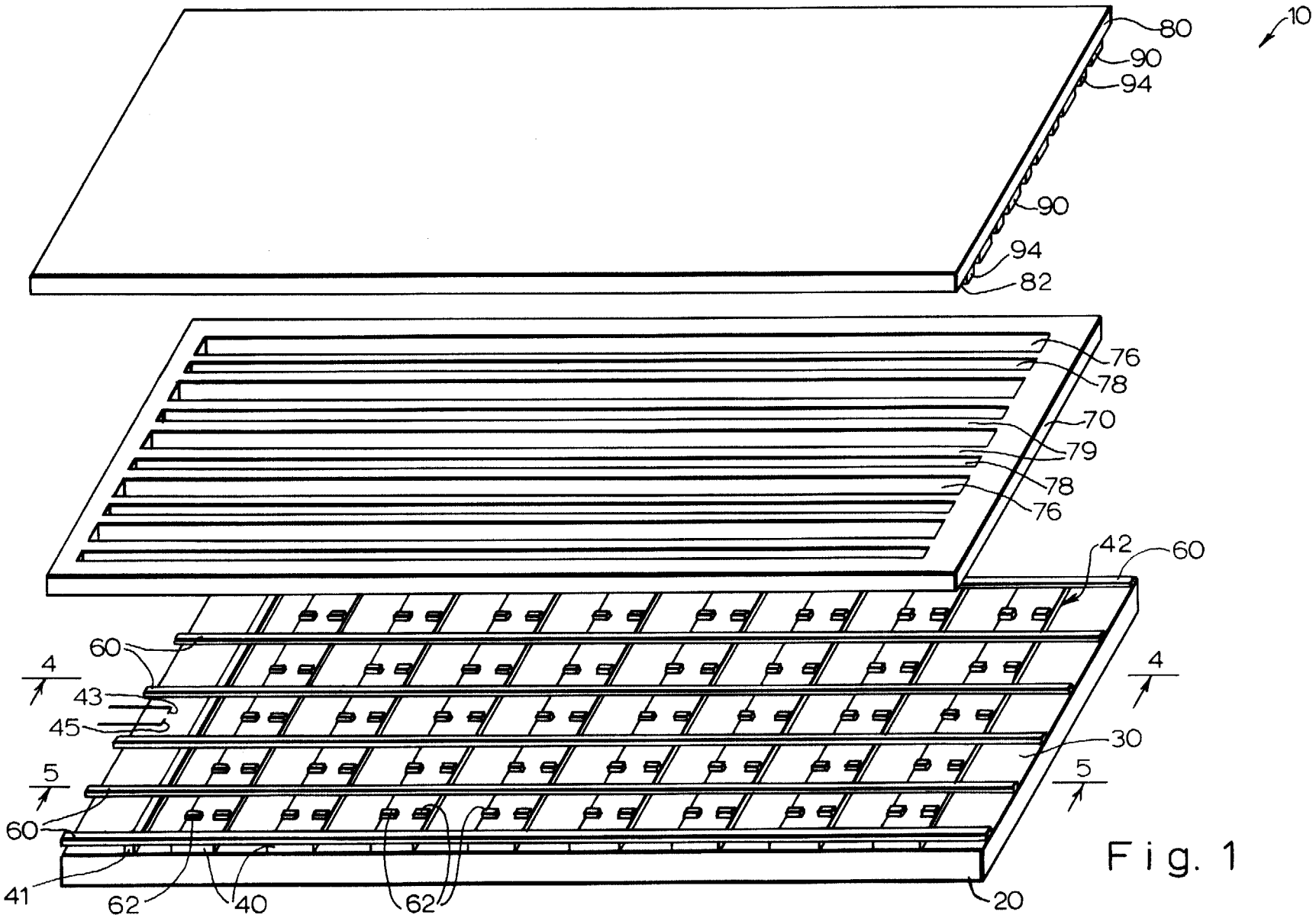
FIG. 1 is an exploded plan view of the parts of a display panel embodying the invention.

A display panel 10 embodying the invention, referring to FIGS. 1, 2, and 3, includes a base plate 20 of insulating material such as glass, ceramic, or the like, and having a top surface 30 on which are provided a plurality of rectangular strips 40 of conductive material arrayed parallel to each other. The conductive strips or electrodes 40 are formed prferably by a screen printing process using any suitable material such as a mixture of nickel and glass frit in a suitable binder.

An auxiliary conductive strip 41, used as a reset cathode in a scanning operation to be described, is disposed adjacent to the first strip 40 at the left-hand end of panel 10. This is arbitrarily considered to be the end at which the scanning cycle will begin. In addition, at least one keep-alive cell is provided near the reset cathode and comprising two electrodes, a cathode 43 and an anode 45, both of which are preferably formed on the base plate.

The conductive strips 40 are subdivided into rows of rectangular areas 42 by means of thin parallel longitudinal lines 60 of insulating material formed on the top surface of the plate and on the strips 40. The lines 60 extend along the length of the base plate. In addition, each of the rectangular areas 42 of the strips 40 is subdivided by means of insulating strips 62 formed on each rectangular area to subdivide each such portion into a first, relatively large-area portion 44, to be operated as a display cathode, and a second generally rectangular but smaller portion 46, to be operated as a scanning or priming cathode. The display cathode portion 44 is connected to the scanning cathode portion 46 by a narrow portion 48 which lies between the insulating portions 62. If a 5 × 7 dot matrix is to be used to form characters in panel 10, then five subdivisions 42 are provided in each strip 40.

The inulating strips 60 and 62 may be formed by a screen printing process.

It is noted that each portion 42 of a strip 40, referring to FIG. 2, thus comprises an electrode pair including electrode 44 and electrode 46, and the electrode pairs and their component electrodes are all arrayed in rows and columns.

The panel 10 includes an insulating plate 70 seated on the base plate 20 and resting on the insulating lines 60 and portions 62 which have a thickness or height of about 2 mils so that they can support the insulating plate 70 above the conductive strips 40. With plate 70 resting on insulating portions 62, gas communication paths are provided between each display cathode 44 and its associated scan cathode 46 through a path 74 extending along the narrow, constricted space 48 between strips 62, as shown in FIGS. 2 and 3.

The insulating plate 70 includes a plurality of horizontal slots 76 and 78, each slot 76 overlaying a row of display cathodes 44, and each slot 78 overlying a row of scan cathodes 46. The lands or ribs 79 between each slot 76 and the adjacent slot 78 overlay insulating portions 62 or insulating lines 60.

The panel 10 also includes a transparent face plate 80 of glass or the like, hermetically sealed to the center plate and the base plate by a seal 95, and carrying on its inner surface 82 a plurality of transparent conductive anode electrodes 90 of tin oxide or the like, each anode overlaying a slot 76 in the center plate and a row of display cathodes. The face plate also carries on its inner surface a plurality of opaque scan anodes 94, each overlaying a slot 78 and a row of scan cathodes.

The panel 10 is filled with a suitable ionizable gas such as neon, xenon, or the like, singly or in combination, at a suitable pressure. The gas atmosphere also includes mercury vapor to minimize cathode sputtering.

In panel 10, various parameters are selected to insure that one column of cathodes glows at a time even though they are connected in groups. These parameters include the spacing of the columns of cathodes from each other, which, in one panel, was about six mils; the spacing of the face plate from the base plate, which was about 25 mils, and the pressure of the gas filling, which in such one panel was about 400 Torr.

Those skilled in the art will be readily able to modify these parameters to achieve the desired operation of modifications of panel 10.

In one mode of operation of panel 10, the strips 40 are electrically connected in groups by means of leds 50A, 50B, 50C, with every fourth electrode being in the same group so that there are three such groups of electrodes. The interconnections 50 can be formed on base plate 20 at the same time as the strips are formed, or they may be provided in any other suitable manner. It will be clear to those skilled in the art, from the following description of the invention and from information already known about SELF-SCAN panels, that other electrode groupings can be used or even that each electrode can be separately connected to an external cicuit However, the electrode groupings provide economies in circuit operation.

Figure 6:
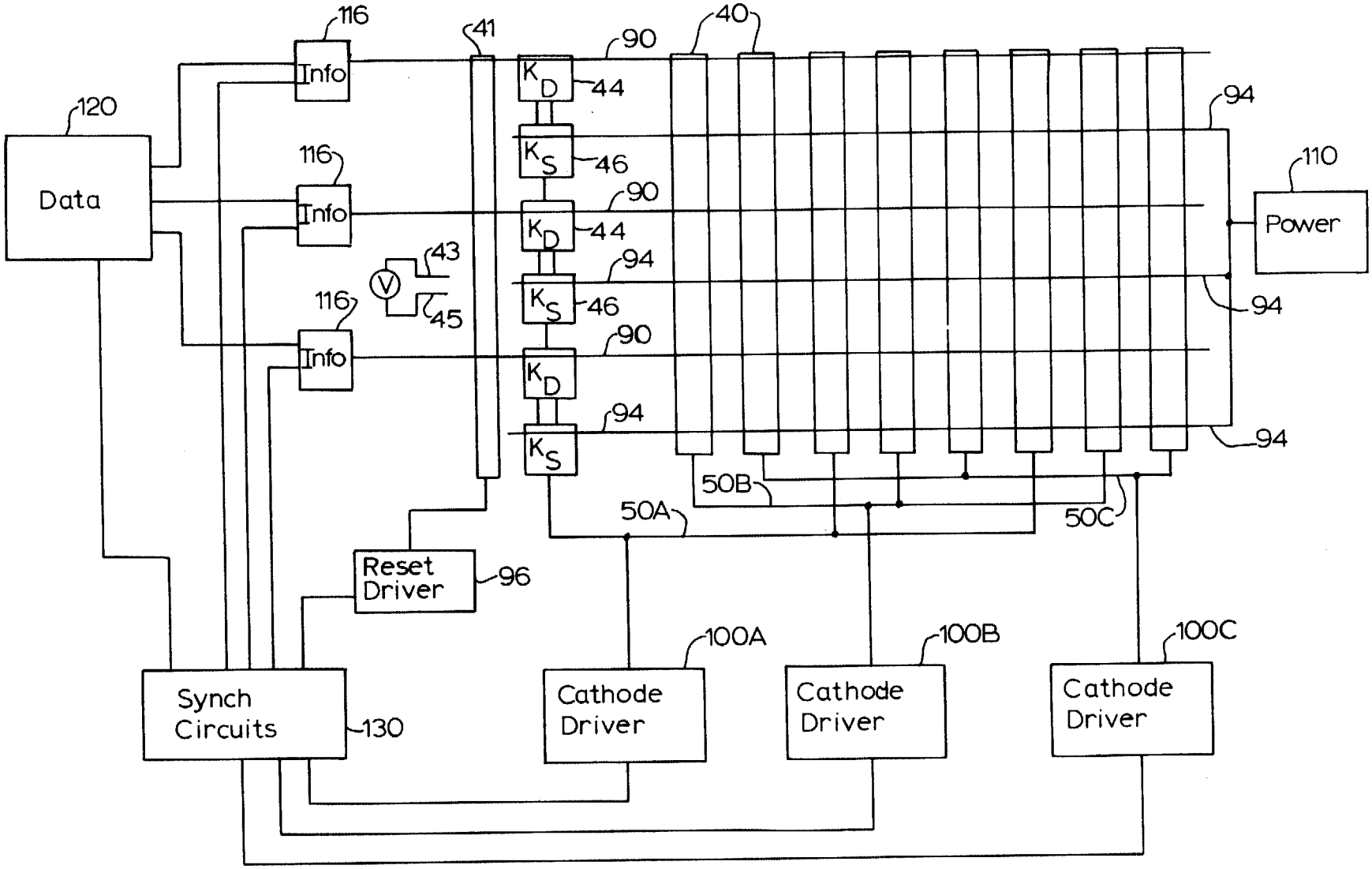
FIG. 6 is a schematic representation of the panel of FIG. 1 and a circuit in which it can be operated.
Figure 10:
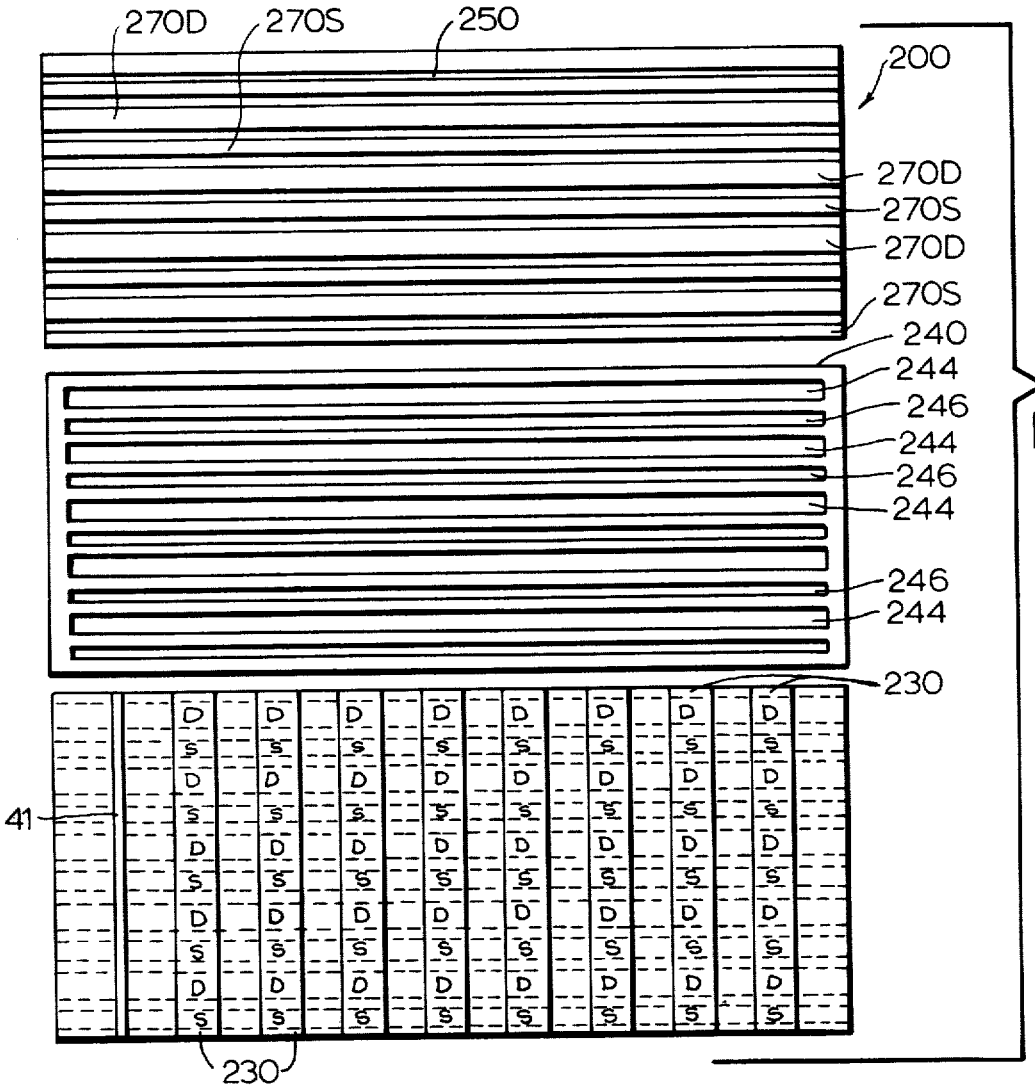
FIG. 10 is an exploded plan view of the panel of FIG. 8.

A system for operating panel 10 is shown in FIG. 6. In the system, the keep-alive electrodes 43 and 45 are connected to a source of potential V, by means of which the keep-alive cell is maintained continually energized and generating exicted particles. The reset cathode 41 is connected to a reset driver 96, and the groups of cathodes 40 are connected by their conductors 50 to separate cathode drivers 100 for connecting each cathode group in an operating circuit. All of the scan anodes 94 are connected together through a suitable resistive path, if required, to a source of generally positive operating potential 110. Each of the display anodes 90 is connected through a separate, suitably resistive path to a source 116 of information signals which themselves are connected to a data sopurce 120 which may include a computer, encoders, decoders, character generator, and the like circuit modules. Suitably synchronizing control circuits 130 are provided for interrelating the various circuit elements to operate as described below.

With the keep-alive cell ON, and all of the scan anodes 94 energized, a pulse or other signal is applied by source 50R to the reset cathode 40R which turns on, exhibits cathode glow, and generates excited particles.

The excited particles thus generated are present near the first column of scan cathodes 46, and, when the first cathode driver 50A is operated to connect the first column of scan cathodes in circuit with the scan anodes, these scan cathodes turn on, exhibit cathode glow, and generate excited particles. Although other columns of scan cathodes in the same group are energized at the same time, they do not glow. This is because the first column of scan cathodes 46 turns on preferentially because it is close to the reset cathode 100R and to the excited particles generated thereby. These particles do not diffuse to the other columns of scan cathodes in the group. In addition, when the first column of scan cathode turns on, it quickly assumes sustaining potential which is lower than the required firing potential for the other columns of scan cathodes in its group.

As each of the cathode drivers 100 is operated in turn, each of the columns of scan cathodes is energized and exhibits cathode glow, in turn, with each column providing excited particles for the next adjacent column. The scan cathode glow is not visible to a viewer since the scan anodes 94 are opaque.

As each of the columns of scan cathodes is energized and the scan cathodes glow, information signals applied to selected display anodes 90 cause cathode glow to transfer from the scan cathode beneath and adjacent to the selected display anodes through the constricted path 48 to the adjacent display cathode, beneath the selected display anode. The display cathode now glows, and this glow is visible to a viewer through the transparent display anodes. This operation is repeated for each column of electrode pairs, and the total scanning operation is repeated cyclically throughout the panel at such a rate that the display cathodes which are energized present an apparently stationary but changeable message. This mode of operation described above is generally similar to that employed in SELF-SCAN panels of the type described in the above-mentioned patent.

The panel 10 may also use modified cathode strips 40 (FIG. 7) in which the rectangular areas 42 are subdivided by rectangular insulating strips 62′ formed on each such subdivided portion 42 and positioned close to strips 60 to form a relatively large-area display cathode portion 44′ and a relatively small-area scan cathode portion 46′. The strips 62′ are spaced from the left and right edges of the cathode strips 40 to provide a narrow constricted path 48′ on each side of the strip. In operation of a panel with cathode strips of the type shown in FIG. 7, glow transfer takes place from a scan cathode 46′ to a display cathode 44′ through the two gas communication paths 48′.

A panel 200 embodying a modification of the invention and shown in FIGS. 8–12 includes a base plate 210 of glass or other suitable insulating material having a top surface 220 on which is formed a plurality of parallel conductive strips 230 disposed generally transverse to the longitudinal axis of the base plate. The conductive strips 230 are operated as cathode electrodes in the completed panel, and they may be formed by a screen printing process as above. If desired, the conductive strips may also comprise individual metallic elements suitably secured to the base plate.

A slotted insulating plate 240 is seated on the cathodes 230 to divide them into generally rectangular elemental areas 230D and 230S. The slots 244 and 246 in the plate are alternately wide and narrow so that the cathodes 230 are divided into alternately large and small areas which, as can be seen, are arrayed in rows and columns. In operation of the panel, the relatively small cathode areas 230S are operated as scanning pr priming cathodes, and the relatively large areas 230D are operated as display cathodes.

The panel is completed by a glass face plate 250 which carries, on it inner surface 260, a plurality of alternate wide and narrow anode strips 270D and 270S, respectively, insulated from each other and disposed parallel to the longitudinal axis of the face plate and the panel. The relatively wide anode strips 270D may be made of material such as tin oxide, and each of these overlays a row of display cathodes 230D. Adjacent to each transparent anode is an opaque anode film or strip 270S of any suitable material, each of which overlays a row of scanning or priming cathodes 230S. Thus, when display cathodes are energized and exhibit cathode glow, the glow is visible through their anodes 270D, and when scanning cathodes are energized and exhibit cathode glow, the glow is not visible through their anodes 270S.

Figure 12:
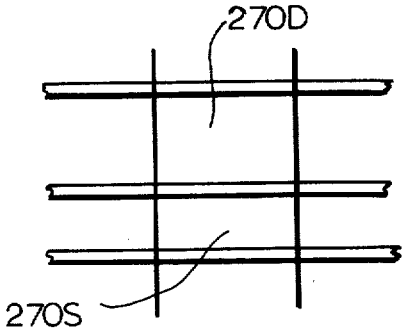
FIG. 12 is an enlarged view of a portion of the panel of FIG. 8 shown to illustrate current flow therein.

Although they are not shown, panel 200 would include a reset cathode and a suitable keep-alive arrangement as required and as described above The operation of panel 200 is essentially the same as the operation of the other panels described above except that, as columns of scanning cells are energized by the application of operating potential to the cathode strips and the scan anodes, the information signals are applied to the display anodes, it is believed that glow is transferred from a scan cathode to the selected adjacent display cathode along the left and right hand edges of the cathode strip through the space between insulating plate 240 and the top surface of base plate 210 as illustrated by the dash lines in FIG. 12.

Figure 13:
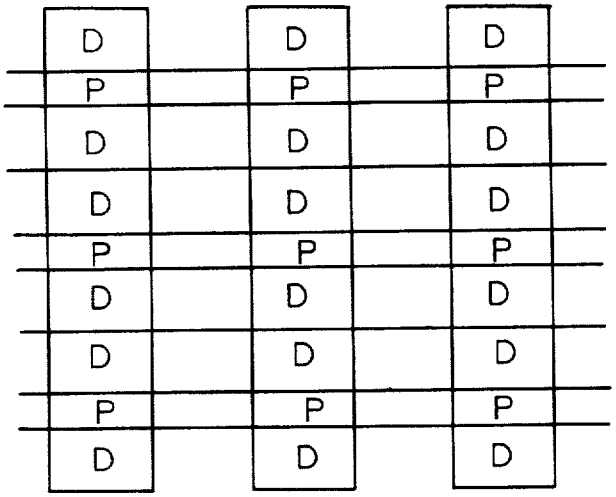
FIG. 13 is a plan view of a modification of a portion of the invention.
Figure 14:
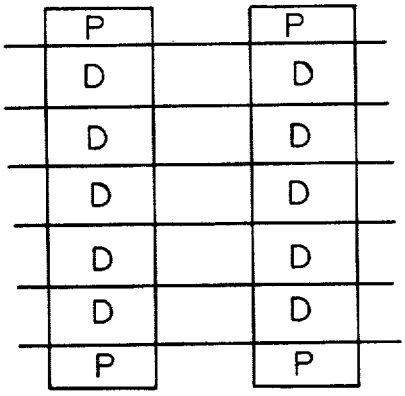
FIG. 14 is a plan view of still another modification of a portion of the invention.
Figure 15:
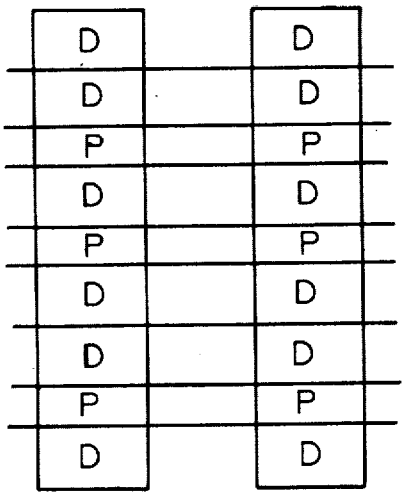
FIG. 15 is a plan view of another modification of the invention.

Although, in the panel described above, a scanning or priming cathode or cell is associated with each display cathode or display cell, it is clear that other arrangements could be used as taught in U.S. Pat. No. 3,683,364. For example, as illustrated schematically in FIG. 13, each two display area D may have a priming area P between them; or, as illustrated in FIG. 14, priming areas may be provided at the upper and lower ends of a column of display areas D; or, as illustrated in FIG. 15, a column of cathode areas may include a relatively random insertion of priming areas, and a column may include two or three display areas in series, a priming area, then two or three display areas, then a priming area, etc. In each case, any of the means described above may be used to divide the cathode surfaces, as desired.

The panel of the invention utilizes principles of operation and some structural features of SELF-SCAN display panels which are made and sold by Burroughs Corporation. Panels of this type are described and claimed in the following copending applications and U.S. patents which are incorporated herein by reference:

Ser. No. 487,955 filed July 12, 1974
Ser. No. 551,539 filed Feb. 20, 1975
Ser. No. 624,531 filed Oct. 22, 1975
Ser. No. 624,532 filed Oct. 22, 1975
U.S. Pat. No. 3,619,698
U.S. Pat. No. 3,683,364
U.S. Pat. No. 3,699,376
U.S. Pat. No. 3,766,420
U.S. Pat. No. 3,767,968
U.S. Pat. No. 3,863,088

What is claimed is:

1. A display panel comprising a gas-filled envelope including a base plate and a face plate having a viewing window, a plurality of columns of coplanar operating cathode areas which are electrically connected in each such column, all of said cathode operating areas having upper surfaces facing said viewing window, said columns of cathode areas including display cathode areas and priming cathode areas, said priming cathode areas providing excited particles for said display cathode areas through gas communication paths extending along said columns of cathode areas, said display areas and said priming areas also being disposed in rows, barrier means between said base plate and face plate and having portions which delineate said rows of display areas and said rows of priming areas, [and] *said gas communication paths extending beneath said barrier means from priming cathode areas to display cathode areas, and* a priming anode overlying each row of priming cathode areas and a display anode overlying each row of display cathode areas, said barrier means also effectively separating adjacent anodes from each other.

2. The panel defined in claim 1 wherein said priming cathode areas are hidden from view by said priming anodes.

[3. The panel defined in claim 1 wherein said barrier means comprises an assembly of a plurality of thin parallel insulating plates positioned between said base plate and said face plate, with said rows of cathode areas being disposed between adjacent plates.]

4. The panel defined in claim 1 wherein said barrier means comprises a slotted [plane] *plate* having a plurality of parallel slots formed therein and extending along the long axis of said plate, said slotted plate being seated on said cathodes with the slots therein extending transversely of said cathodes and crossing all of said cathodes, there being a separate slot overlying each row of said discrete areas of said cathodes.

5. A display panel as in claim 1 wherein said display cathode areas and said display anodes define display cells, and said priming cathode areas and said priming anodes define priming cells and including means coupled to said display cathode areas and said display anodes for applying each of a succession of groups of information signals to said display anodes and said columns of display cathode areas, and means coupled to said priming cathode areas and said priming anodes for producing a glow discharge in each column of priming cathode areas, and then in the remaining columns of priming cathode areas, one after the next, to scan said columns of priming cathode areas, one at a time, in synchronism with the application of said successive groups of information signals, to produce glow discharges in selective display cells adjacent the priming cathode areas being scanned, one after the next, to provide an overall glow discharge pattern directly in the display cells.

6. The panel defined in claim 1 wherein each column of cathodes includes a series of display cathode areas and priming cathode [arreas] *areas* which alternate with each other.

7. The panel defined in claim 6 and including barrier [mean] *means* disposed between a display cathode area and the adjacent priming cathode area, said barrier means being shaped to provide a *constricted* particle communication path between a priming cathode area and the adjacent display cathode area.

8. The panel defined in claim 1 wherein each priming cathode and its associated priming anode comprise a glow priming cell, there thus being columns of glow priming cells, and each display cathode and its display anode comprise a display cell, there thus being columns of display cells, means for producing a priming glow discharge in all of the glow priming cells of a column of such glow priming cells, and then in all of the cells of the remaining glow priming cell columns, one column after the next, to scan the glow priming cells, and means for applying each of a succession of groups of information signals selectively to said columns of display cells, in synchronism with the scanning of the columns of glow priming cells to produce display glow discharges in selected display cells.

9. The panel defined in claim 1 wherein each column of cathode areas includes a plurality of display areas in series followed by a priming cathode area and this followed by a plurality of display cathode areas, followed by a priming cathode area.

10. The panel defined in claim 1 wherein each column of cathode areas includes a plurality of display cathode areas and at least one priming cathode area.

11. The panel defined in claim 1 wherein each column of cathode areas includes a series of display cathode areas and priming cathode areas at the ends thereof.

12. A display panel comprising a gas-filled envelope including a base plate and a face plate having a viewing window, a plurality of coplanar, parallel cathode electrode strips supported in said envelope with their upper operating surfaces facing said viewing window, barrier means extending across and dividing said operating surfaces of said cathode electrode strips into a plurality of discrete operating cathode areas including display cathode areas and priming cathode areas, said display cathode areas being aligned in rows and said priming cathode areas being aligned in rows, a priming anode electrode overlying each row of priming cathode areas and a display anode electrode overlying each row of display cathode areas, said barrier means being interposed between adjacent ones of said anodes.

13. The panel defined in claim 12 wherein said barrier means comprises an assembly of thin parallel insulating plates disposed on edge between said base plate and face plate and extending horizontally to provide row channels in which said rows of display cathodes and priming cathodes are disposed.

14. The panel defined in claim 13 wherein said plates are supported on said cathode strips and are spaced from the base plate by the thickness of the cathodes, the space thus provided serving as a particle communication path along a cathode strip.

15. The panel defined in claim 12 wherein each crossing of a priming anode and a priming cathode area forms a priming cell, and each crossing of a display anode and a display cathode area forms a display cell, there being a series of columns of priming cells and display cells, means for applying each of a succession of groups of information signals to each of said columns of display cells in turn, and means for producing a glow discharge in each column of priming cells, one after the next, to scan said columns of priming cells, one at a time, in synchronism with the application of said successive groups of information signals, to produce glow discharges in selective display cells adjacent the priming cells being scanned in each column, one after the next, to provide an overall glow discharge pattern directly in the display cells.

16. The panel defined in claim 12 wherein said anodes are films formed on said face plate and said priming anodes are opaque.

*17. A display panel comprising*

*a gas-filled envelope including a base plate and a face plate having a viewing window,*

*a plurality of columns of coplanar operating cathode areas which are electrically connected in each such column, all of said cathode operating areas having upper surfaces facing said viewing window,*

*said columns of cathode areas including display cathode areas and priming cathode areas, said priming cathode areas providing excited particles for said display cathode areas through gas communication paths extending along said columns of cathode areas,*

*said display areas and said priming areas also being disposed in rows,*

*barrier means between said base plate and face plate and having portions which delineate said rows of display areas and said rows of priming areas,*

*said barrier means comprising an insulating cell sheet disposed between said base plate and said face plate and having a plurality of channels defined by a plurality of thin parallel walls, each channel being aligned with a row of cathode areas and defining a row of priming cells or a row of display cells, and*

*a priming anode overlying each row of priming cathode areas and a display anode overlying each row of display cathode areas, said barrier means also effectively separating adjacent anodes from each other.*

*18. The panel defined in claim 17 wherein said gas communication paths extend under said barrier means.*

*19. A display panel comprising*

*a gas-filled envelope including a base plate and a face plate having a viewing window;*

*a plurality of coplanar, parallel cathode electrode strips supported in said envelope with their upper operating surfaces facing said viewing window,*

*barrier means extending across and dividing said operating surfaces of said cathode electrode strips into a plurality of discrete operating cathode areas including display cathode areas and priming cathode areas, said display cathode areas being aligned in rows and said priming cathode areas being aligned in rows,*

*there being gas communication paths for excited particles along the edges of said cathode electrode strips beneath said barrier means which rests on said cathode electrode strips, and*

*a priming anode electrode overlying each row of priming cathode areas and a display anode electrode overlying each row of display cathode areas, said barrier means being interposed between adjacent ones of said anodes.*

* * * * *